Aug. 26, 1924. 1,506,693
A. C. TIRAPANI
IRON REENFORCED SHOE HEEL
Filed Jan. 21, 1920  3 Sheets-Sheet 1
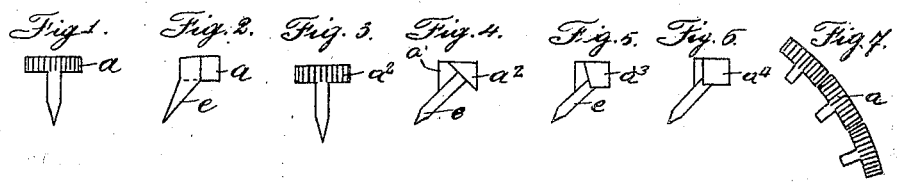
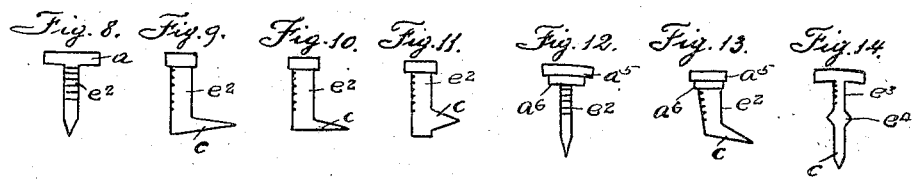
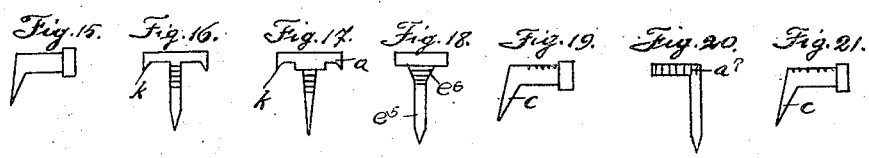
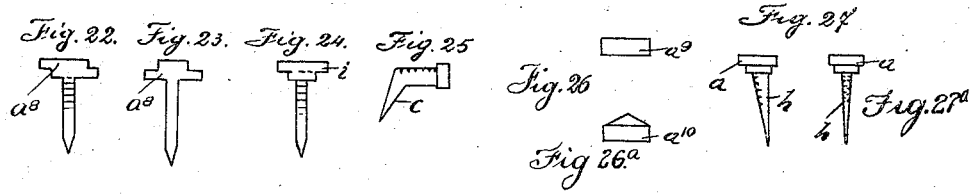
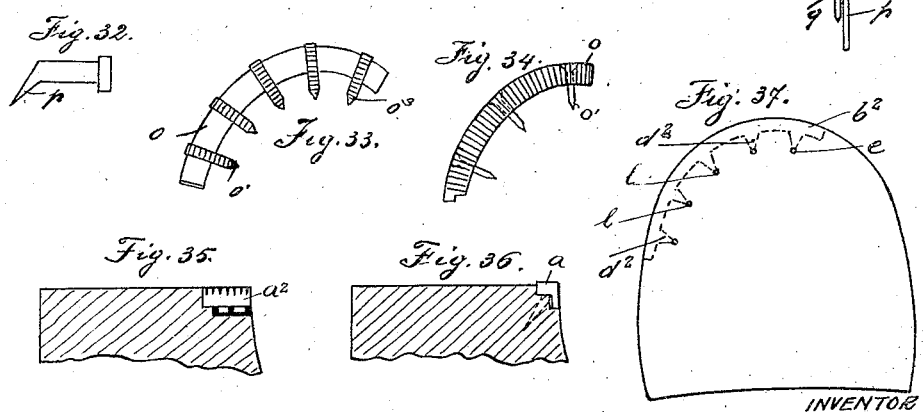
INVENTOR
ALFREDO CARLO TIRAPANI
BY
ATTORNEYS.

Aug. 26, 1924.                                    1,506,693
                    A. C. TIRAPANI
               IRON REENFORCED SHOE HEEL
              Filed Jan. 21, 1920     3 Sheets-Sheet 2

INVENTOR
ALFREDO CARLO TIRAPANI
BY Munn&Co
ATTORNEYS

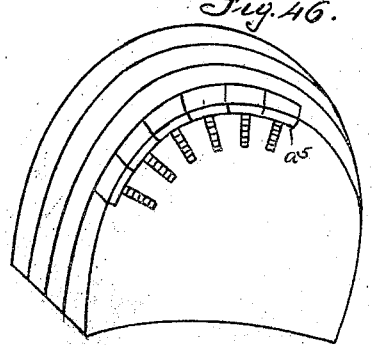
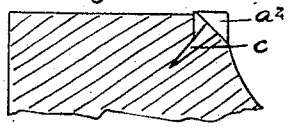
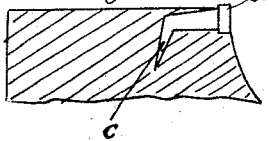
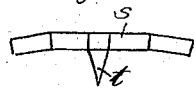
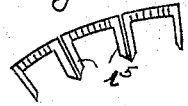
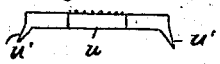
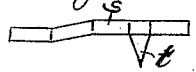
INVENTOR
ALFREDO CARLO TIRAPANI.
BY
ATTORNEYS.

Patented Aug. 26, 1924.

1,506,693

UNITED STATES PATENT OFFICE.

ALFREDO CARLO TIRAPANI, OF BOLOGNA, ITALY.

IRON-REENFORCED SHOE HEEL.

Application filed January 21, 1920. Serial No. 352,995.

*To all whom it may concern:*

Be it known that I, ALFREDO CARLO TIRAPANI, a subject of the King of Italy, residing at 21 Via Farini, Bologna, in the Kingdom of Italy, have invented certain new and useful Improvements in Iron-Reenforced Shoe Heels, of which the following is a specification.

The present invention relates to a shoe-heel the edge of which is fitted with a rim of nails of substantially T-shape with the shanks arranged radially to the heel and fitted into corresponding grooves in the heel as a means of reinforcing the heel and preventing slipping, and to a variety of single T-shaped nails or strips resulting from T-nails having a common head bar made of iron, brass, steel or any other suitable metal to the object of protecting the portion most liable to wear and preventing the danger of slipping in the most absolute manner.

The characteristic feature of the novel nails consists in the T-shape thereof with square, rectangular or otherwise shaped head and with flat, straight or bent shank, the parts coming into contact with the ground or with leather being serrated or not.

Fig. 1 shows a T-shaped nail in front view.

Fig. 2 shows the same in side view.

Fig. 3 shows another construction of T-shaped nail in front view.

Fig. 4 shows the same in side view.

Figs. 5 and 6 show in side views similar constructions of nails having respectively triangular and square heads.

Fig. 7 shows the nails arranged in succession along the rear edge of the heel.

Fig. 8 shows another T-shaped nail in front view.

Figs. 9, 10 and 11 show three alternative constructions of the same nail as concerns the shape of the points, in side view.

Fig. 12 shows a T-shaped nail with reenforced head in front view.

Fig. 13 shows the same nail in side view after the point has been bent.

Fig. 14 shows in front view a T-shaped nail having the mid portion of the shank swelled.

Fig. 15 shows the same nail with bent point in side view.

Figs. 16, 17 and 18 show three further constructions of T-shaped nails in front view.

Fig. 19 shows the same in side view after the point has been bent.

Fig. 20 shows a nail with the head at right angles with the shank in front view.

Fig. 21 shows the same in side view upon bending the point.

Figs. 22 and 23 show some other constructions of T-shaped nails in front view.

Figures 24 and 25 shows the same in side view with bent point.

Figures 26 and 26ª show in plan heads suitable for any of the nails.

Figs. 27 and 27ª show further constructions of nails.

Fig. 28 shows a metal strip having shanks projecting naillike therefrom, in front view.

Fig. 29 shows a side view of the same, after the point has been bent when fitted in the heel.

Fig. 30 shows a metal strip, which conveniently folded up forms the nail according to Fig. 31.

Fig. 31 shows the nail resulting from the metal strip Fig. 30.

Fig. 32 is a side view of said nail, the point having been bent.

Fig. 33 shows a metal strip having applied thereto grip members acting as nail shanks.

Fig. 34 shows a metal strip L-shaped in cross section to be applied by means of rivets or screws to the heel edge.

Figs. 35 and 36 show how said strip as per Figs. 33 and 34 resp. are to be fitted on the heel edge.

Fig. 37 shows in plan a heel having a groove at the edge for receiving the succession of nails.

Figs. 38, 39, 40, 41, 42, 43 and 44 show in plan heels having fitted thereto nails as per Figs. 8, 12, 14, 16, 20, 22, 23 and 24 in combination.

Figure 45:
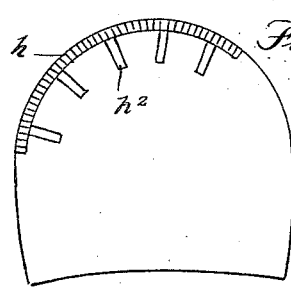

Fig. 45 shows in plan a heel having applied thereto a strip as per Fig. 28.

Fig. 46 shows in perspective view a heel having nails applied thereto as per Fig. 8.

Figs. 47, 48 and 49 show in cross sections heels having nails as per Figs. 4, 6 and 19 respectively fitted thereto.

Figs. 50, 51 and 52 shows a strip having a projecting point and the nail resulting from folding same.

Figs. 53 and 54 show [-shaped nails in front view and the metal strips for obtaining same.

Figs. 55, 56 and 57 show in cross section a metal tube, a nail formed therefrom in plane, and the same in side view.

The nails, with their shank straight or bent to an angle and with their head plain or reenforced are advantageously provided with a flat head so that they can suit a length of the curved edge of the heel.

Where the heel is more liable to wear a small amount of leather should be cut away with a knife or other suitable tool, the amount cut away corresponding to the thickness of the nail head, as shown at $b$ in Fig. 37; with a punch or similar tool the radially directed recesses or grooves $d$ should be formed, in order to facilitate the application of the nails, and holes $e$ (Fig. 37) should also be bored at the ends of said grooves $d$ in order that the nail point $c$ (Figs. 2, 9, 10 and 11 and others) may be more readily driven into the leather.

Figure 38:
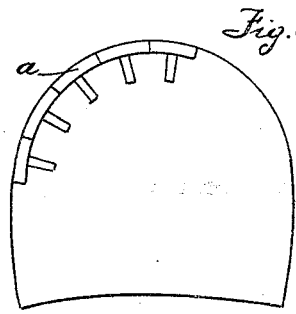
Figure 39:
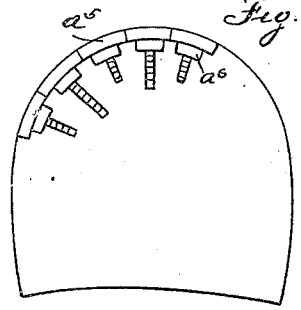
Figure 40:
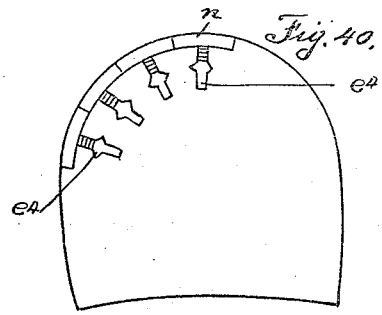
Figure 41:
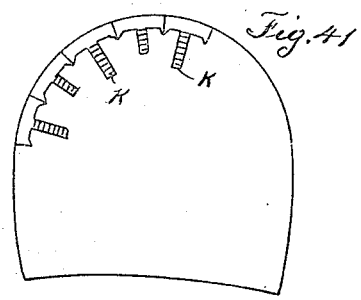
Figure 42:
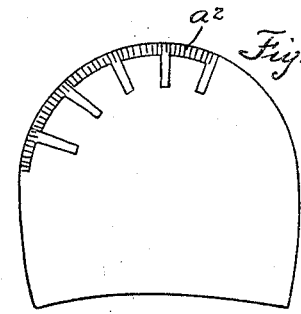
Figure 43:
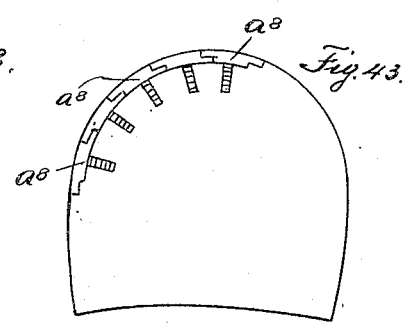
Figure 44:
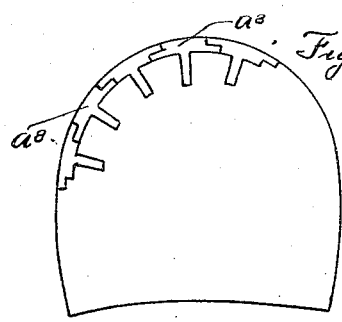

As the nails are to be arranged in a half-circle in order to prevent the shank ends fouling each other and thus impairing their steadiness, long and short shank nails should be used alternately (as shown in Figs. 39 and 41).

By proceeding in the described manner, from the various nails a metal rim will be obtained round the heel, the rim being formed by the contiguous heads $a$ of the various nails forming a metallic strip. The radial arrangement of the nail shanks separated by small radial leather strips will tend to maintain the heel surface level and therewith ensure a longer life of the shoe and effectively prevent slipping.

Nails with straight shanks may be used and the shank ends may be bent after they have been driven home, and the shank may be triangular, rectangular in section. The shank may also be corrugated or curved, and the nail head may be provided with teeth $k$ or projections.

The nail according to Figures 1 and 2 has a shank $e$ and a head $a$ the outer surface of which can be corrugated; the shank $c$ is slightly inclined in respect of the head for the purpose of easy penetrating into the underface of the heel; the head is of square section.

According to Figures 3 and 4 the nail has a head of substantially triangular shape in cross section reenforced by the web $a'$; the alternative construction according to Figures 5 and 6 show web reenforced heads $a^3$ and $a^4$ having respectively quadrangular and square shape in section.

The nails are arranged on the heel with their head in succession, forming thereby an arc of circle (Figure 7).

Whilst the above described nails have straight shanks, the nails according to Figures 8, 9, 10 and 11 have roughened or serrated shanks $e^2$ which are bent at right angles to the shank so as to form a point $c$ which projects perpendicularly from the shanks so as to penetrate into the heel body; in these cases the straight portion of the nails lies on the heel surface and assists the head in preventing the slipping.

Figures 12 and 13 show a nail, the head of which is formed by two superposed plates $a^5$ and $a^6$ of different length, the end portion of the shank being bent at an angle to the shank body to form a point $c$.

A reinforcement to the shank $e^3$ of the nail can be given by providing same with a swelling at mid length thereof, as shown at $e^4$ (Figs. 14 and 15).

The head can be prevented from being detached from the edge of the heel by providing same with points or teeth $k$ (Figs. 16 and 17) or it can be reenforced by the cone shaped root portion $e^6$ of the shank $e^5$ (Figs. 18 and 19).

The T-shape of the nail can be modified by dispensing with one portion of the head. A T-shaped nail $a^7$ results thereby, Figs. 20 and 21), superposed bars, respectively displaced each other or of different length, (Figures 22 and 23) so as to form a stepped head $a^8$ so that the end of one nail's head overlaps the thickness of the head of the adjacent nail.

Figures 26 and 26$^a$ show a rectangular head $a^9$ and a head $a^{10}$ with a conical face respectively. When it is assumed that the nails be joined together at the ends of the head bars, a strip $h$ (Figures 28 and 29) will result, having normally projecting shanks $h'$; this strip is bent to suit the curvature of the heel edge and will perform a reinforcing and protecting member for the heels.

Instead of forming the nails of the above described shapes from a bar or wire by stamping or pressing processes in the known manner, same can be built up from a metal strip Figures 30, 31 and 32, the portions adjacent the central portion being bent on the lines $n$, and then on the lines $m$, as to form the head $m$—$n$—$n$—$m$, and the double layer shank $p$—$q$, one element of which can be longer and bent at the end.

According to the Figures 33 and 34, the common strip $a$ resulting from assembling the head into a single one, are materially increased in size and the shanks $c$ are rigidly or movably applied thereto to form a composite construction which is fitted to the heel as shown Figures 35 and 36.

The lower surface of the heel having been grooved at $b^2$ and $d^2$, and bored at 1 as shown Figure 37, according to the different shapes of the nails above described, the nails are fitted thereto; some examples thereof are as shown in Figures 38 to 46.

Figures 47, 48 and 49 show how the nails shown in Figures 4, 6 and 19 can be inserted into the heels.

The nail shown in Figures 30 and 31 can be modified according to the showing of Figures 50, 51 and 52; from one of the portions of the strip $s$ a point $t$ is projecting; the strip is folded so as to take the form of a T-nail.

The nails can be provided with two shanks $e^8$ each; (Fig. 53); the head forms the yoke therefor; or be made from a strip $a$ to be folded with pointed ends $u'$ Figure 54, or by crushing a metal tube $v$, (Fig. 55) so that a double wall T shaped structure (Figs. 56, 57) is obtained.

Having now particularly described and ascertained the nature of my said invention and in what manner the same is to be performed, what I claim, and desire to secure by Letters Patent, is:—

1. A shoe heel protecting rim consisting of nails made up of a head bar to be arranged along the heel edge, shanks perpendicular thereto, and having the points so bent as to enter into the heel, whereby when a plurality of said nails are arranged along a heel edge said heads form a protecting rim therefor and said shanks extend radially toward the center of the heel to protect the tread surface thereof.

2. A shoe heel protecting rim, comprising a plurality of nails having arcuate bar-like heads and angular shanks, the nails being adapted to be arranged along the edge of the heel with their heads in contact with each other to form a protecting rim therefor and their shanks extending radially of the heel to protect the tread surface thereof.

3. A protector for shoe heels comprising a shank having angular and pointed ends adapted to be driven into a shoe heel tread, said shank being provided with a bar head having its opposite faces complementally recessed adjacent to their extremities whereby when a plurality of said protectors are arranged in proper relation with respect to one another, said heads will overlappingly engage one another to form a protecting rim of substantially uniform thickness.

4. A protector for shoe heels comprising a shank having an angular and pointed ends adapted to be driven into the heel tread, said shank being provided with a bar head having complementary end portions, and a projection intermediate said end portions and lying in the same plane therewith, whereby when a plurality of said protectors are driven into a heel in proper relation with respect to one another the several heads cooperate to form a continuous protecting rim and said projections cooperate therewith to protect a relatively large area of the tread surface of the heel.

5. A protector for shoe heels comprising a shank having angular and pointed ends adapted to be driven into a heel tread, said shank being provided with an arcuate bar head having its opposite faces complementally recessed and a projection intermediate the ends of said head and in the same plane therewith, whereby when a plurality of said protectors are driven into a heel in proper relation with respect to one another, the several heads will overlap to form a continuous protecting rim of arcuate formation with said projections extending radially therefrom.

Signed, at Milan (Italy), this 22nd day of December 1919.

ALFREDO CARLO TIRAPANI.